(12) United States Patent
Asahara et al.

(10) Patent No.: US 7,194,850 B2
(45) Date of Patent: Mar. 27, 2007

(54) RIDING LAWN MOWER

(75) Inventors: Masato Asahara, Sakai (JP); Yoshikazu Togoshi, Osaka (JP); Koji Fujiwara, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 11/215,354

(22) Filed: Aug. 30, 2005

(65) Prior Publication Data

US 2006/0042214 A1    Mar. 2, 2006

(30) Foreign Application Priority Data

Sep. 1, 2004    (JP) .............................. 2004-254517

(51) Int. Cl.
  *A01D 43/00*    (2006.01)
  *A01D 43/06*    (2006.01)
(52) U.S. Cl. .......................................... 56/202; 56/204
(58) Field of Classification Search .................. 56/202, 56/204, 203, 205, 206, 320.2, 16.6
See application file for complete search history.

(56) References Cited

U.S. PATENT DOCUMENTS

| 4,589,249 | A | * | 5/1986 | Walker et al. | ............... | 56/16.6 |
| 4,835,951 | A | * | 6/1989 | Walker | ....................... | 56/16.6 |
| 5,036,650 | A | * | 8/1991 | Tesch et al. | .................. | 56/16.6 |
| D362,447 | S | * | 9/1995 | Lamb | ........................... | D15/15 |
| 5,473,871 | A | * | 12/1995 | Fava et al. | .................... | 56/14.7 |
| 6,089,006 | A | * | 7/2000 | Langford et al. | ............. | 56/202 |
| D486,756 | S | * | 2/2004 | Mondigo et al. | ............... | D12/1 |
| 2001/0025471 | A1 | * | 10/2001 | Fries et al. | .................... | 55/320 |

FOREIGN PATENT DOCUMENTS

| JP |    7-155041 | 6/1995 |
| JP |    9-215424 | 8/1997 |
| JP |    10-4742 | 1/1998 |
| JP |    2568257 | 1/1998 |
| JP |    11-56064 | 3/1999 |
| JP |    2002-101725 | 4/2002 |

* cited by examiner

*Primary Examiner*—Árpád Fábián Kovács
(74) *Attorney, Agent, or Firm*—The Webb Law Firm

(57) ABSTRACT

A riding lawn mower comprises, a plurality of front wheels and a plurality of rear wheels; a vehicle body supported by the front wheels and the rear wheels, and supporting a driver's seat; an engine disposed in a rear position of the vehicle body; a hood housing the engine; a mower unit suspendible from the vehicle body; and a grass catcher for collecting grass clippings from the mower unit. The grass catcher includes a left side container portion; a right side container portion; and a center container portion communicating with the left and right side container portions in upper positions of the left and right side container portions, and having a planar bottom. When the grass catcher is in a collecting position, the bottom of the center container portion is located above and along the hood, and at least lower part of each of the left side container portion and the right side container portion is located laterally of the hood, the center container portion, the left side container portion and the right side container portion defining a recessed space extending over an entire fore and aft length thereof for accommodating at least part of the hood.

19 Claims, 8 Drawing Sheets

RIDING LAWN MOWER

BACKGROUND OF THE INVENTION

This invention relates to a riding lawn mower with a motor section having an engine mounted on a rear portion of a vehicle body, and a grass catcher for collecting grass clippings from a mower unit.

A conventional riding lawn mower of the type noted above, as shown in Japanese Patent Application "Kokai" No. 2002-101725 (Patent Document 1) (paragraph [0009], FIG. 1), has a grass catcher 8 disposed above an engine hood 5. Another example of such lawn mower has a grass catcher disposed at the rear end of a body frame as shown in Japanese Utility Model Registration No. 2568257 (Patent Document 2) (paragraph [0012], FIG. 1).

With the grass catcher located according to the technique shown in Patent Document 1, an increase in the capacity of the grass catcher will result in an increased height of the grass catcher, tending to hamper rearward visibility from the driving platform. Besides, the weight of the grass catcher and grass clippings collected therein tends to raise the height of gravitational center of the entire lawn mower.

With the grass catcher located according to the technique shown in Patent Document 2, an increase in the capacity of the grass catcher will cause the grass catcher to project to a large extent rearward from the body frame, thereby increasing the longitudinal dimensions of the entire lawn mower.

SUMMARY OF THE INVENTION

The object of this invention is to provide a riding lawn mower in which a sufficient capacity of a grass catcher is secured while maintaining rearward visibility with lower height of gravitational center, and smaller longitudinal dimension.

A riding lawn mower according to this invention comprises:

a plurality of front wheels and a plurality of rear wheels;

a vehicle body supported by the front wheels and the rear wheels, and supporting a driver's seat;

an engine disposed in a rear position of the vehicle body;

a hood housing the engine;

a mower unit suspendible from the vehicle body; and a grass catcher for collecting grass clippings from the mower unit, the grass catcher including:

a left side container portion;

a right side container portion; and a center container portion communicating with the left and right side container portions in upper positions of the left and right side container portions, and having a planar bottom;

wherein, when the grass catcher is in a collecting position, the bottom of the center container portion is located above and along the hood, and at least lower part of each of the left side container portion and the right side container portion is located laterally of the hood, the center container portion, the left side container portion and the right side container portion defining a recessed space extending over an entire fore and aft length thereof for accommodating at least part of the hood.

That is, the grass catcher has a recess for accommodating at least part of the hood. This construction helps alleviate the shortcomings encountered in the prior art.

DETAILED DESCRIPTION OF THE PREFERRED EMBODIMENTS

A preferred embodiment of the invention will be described hereinafter with reference to the accompanying drawings.

Figure 1:
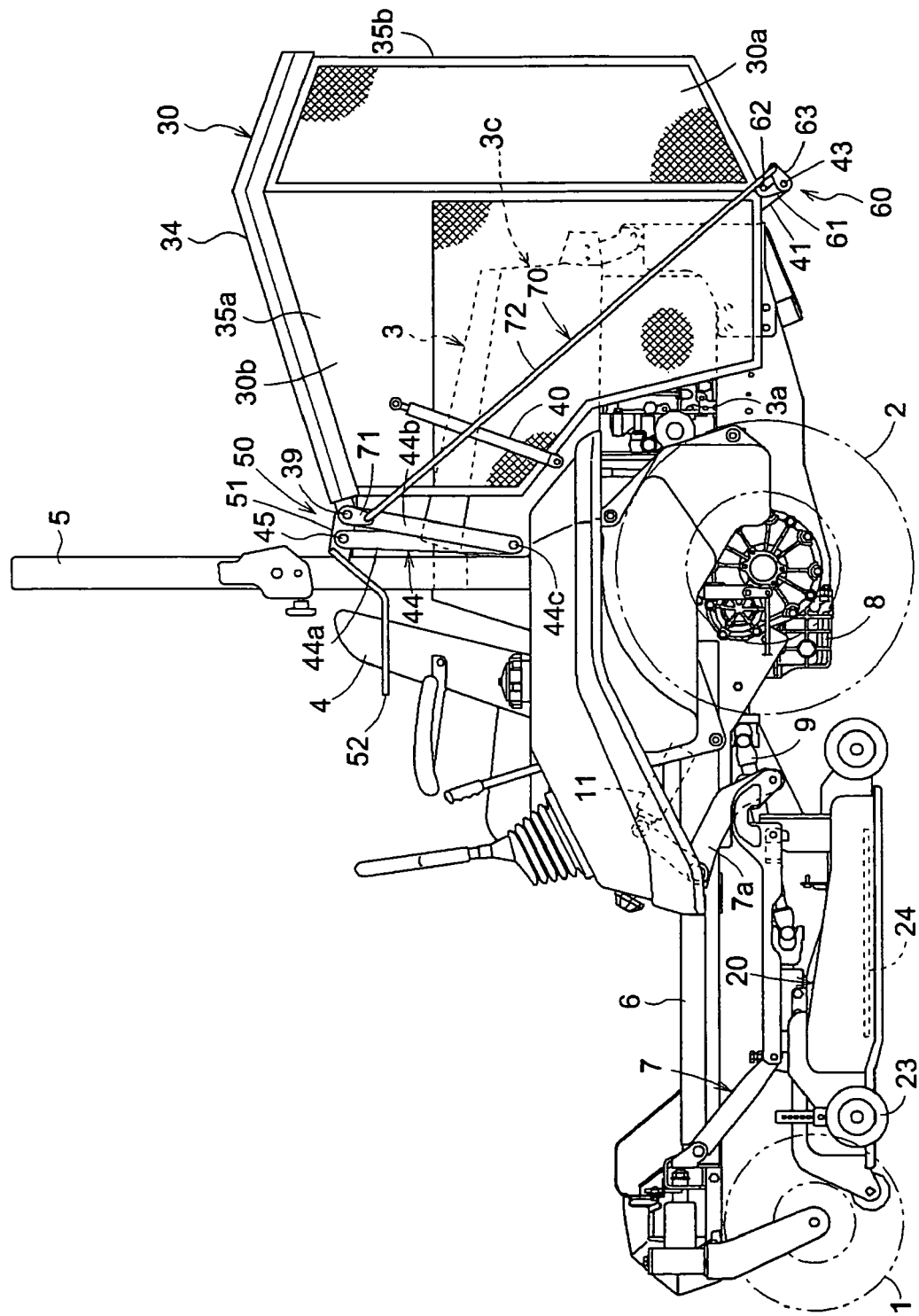
FIG. 1 is a left side elevation of a riding lawn mower according to this invention.
Figure 2:
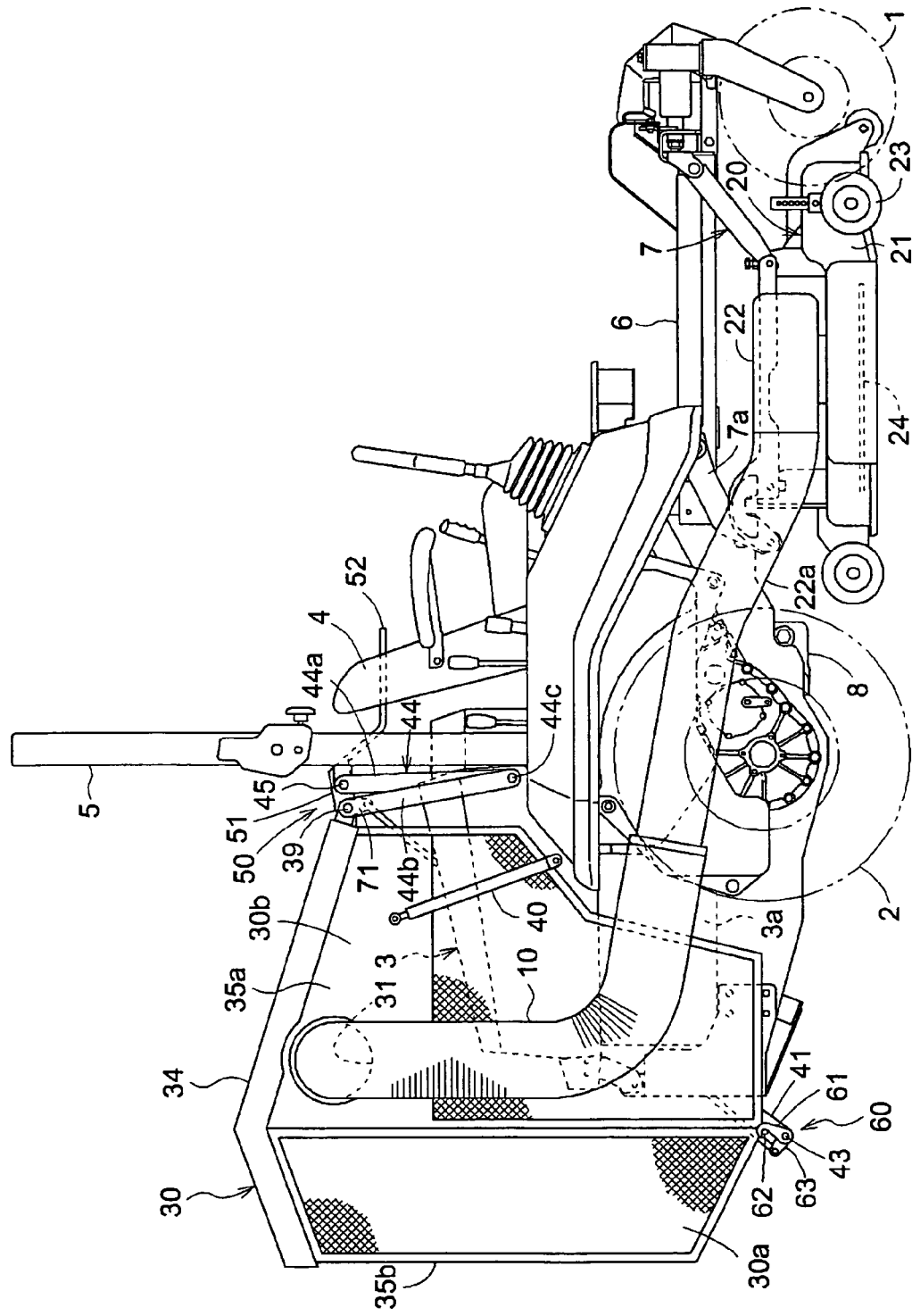
FIG. 2 is a right side elevation of the riding lawn mower.
Figure 3:
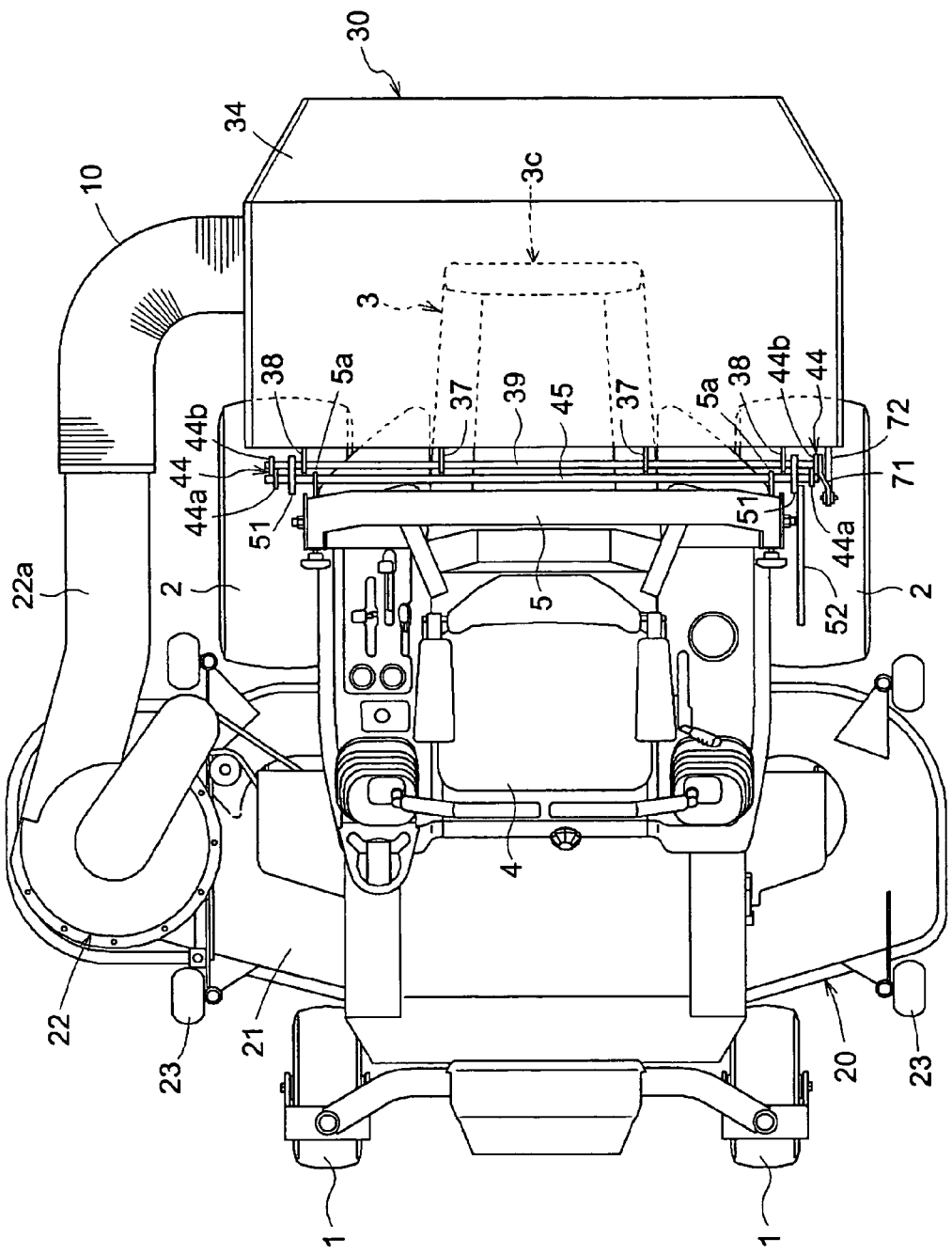
FIG. 3 is a plan view of the riding lawn mower.

As shown in FIGS. 1, 2 and 3, a riding lawn mower includes a pair of right and left caster type front wheels 1, a pair of right and left rear drive wheels 2, and a motor section 3 having an engine 3a mounted rearwardly of a vehicle body. The motor section 3 has an outer configuration defined by an engine hood 3b. The engine hood 3b has a rear surface 3c. The riding lawn mower further includes a driving platform having a driver's seat 4 located adjacent the front of the motor section 3, a rollover protection frame 5 located adjacent the rear of the driver's seat 4, and a body frame 6 of the vehicle body. A mower unit 20 is connected through a link mechanism 7 to the vehicle body between the front and rear wheels. Drive of the engine 3a is transmitted to the mower unit 20 through a transmission case 8 and a rotary shaft 9. A grass catcher 30 is disposed at the rear of the vehicle body. A blower 22 disposed at a lateral end of a blade housing 21 of the mower unit 20 has a discharge pipe 22a communicating with a grass inlet 31 located at a lateral end of the grass catcher 30 through a transport duct 10 formed of a flexible plastic tube extending along a side of the vehicle body.

When a lift cylinder 11 interlocked with rear links 7a of the link mechanism 7 is extended and contracted, the link mechanism 7 is swung vertically relative to the body frame 6. As a result, the mower unit 20 is moved between an operative state having ground-engaging gauge wheels 23 lowered to the ground, and an inoperative state with the ground-engaging gauge wheels 23 raised from the ground. When the vehicle body runs with the mower unit 20 placed in the lower, operative state, the mower unit 20, the mower unit 20 reaps grass with a plurality of rotary blades 24 arranged in the blade housing 21 transversely of the vehicle body and driven to rotate about vertical axes. Grass cut by the rotary blades 24 (hereinafter called grass clippings) is transported by air currents generated by rotation of the rotary blades 24, and carrier air flows generated by the blower 22, from the blade housing 21 through the transport duct 10 to the grass catcher 30. The grass catcher 30 collects and accumulates the grass clippings from the mower unit 20.

Figure 4:
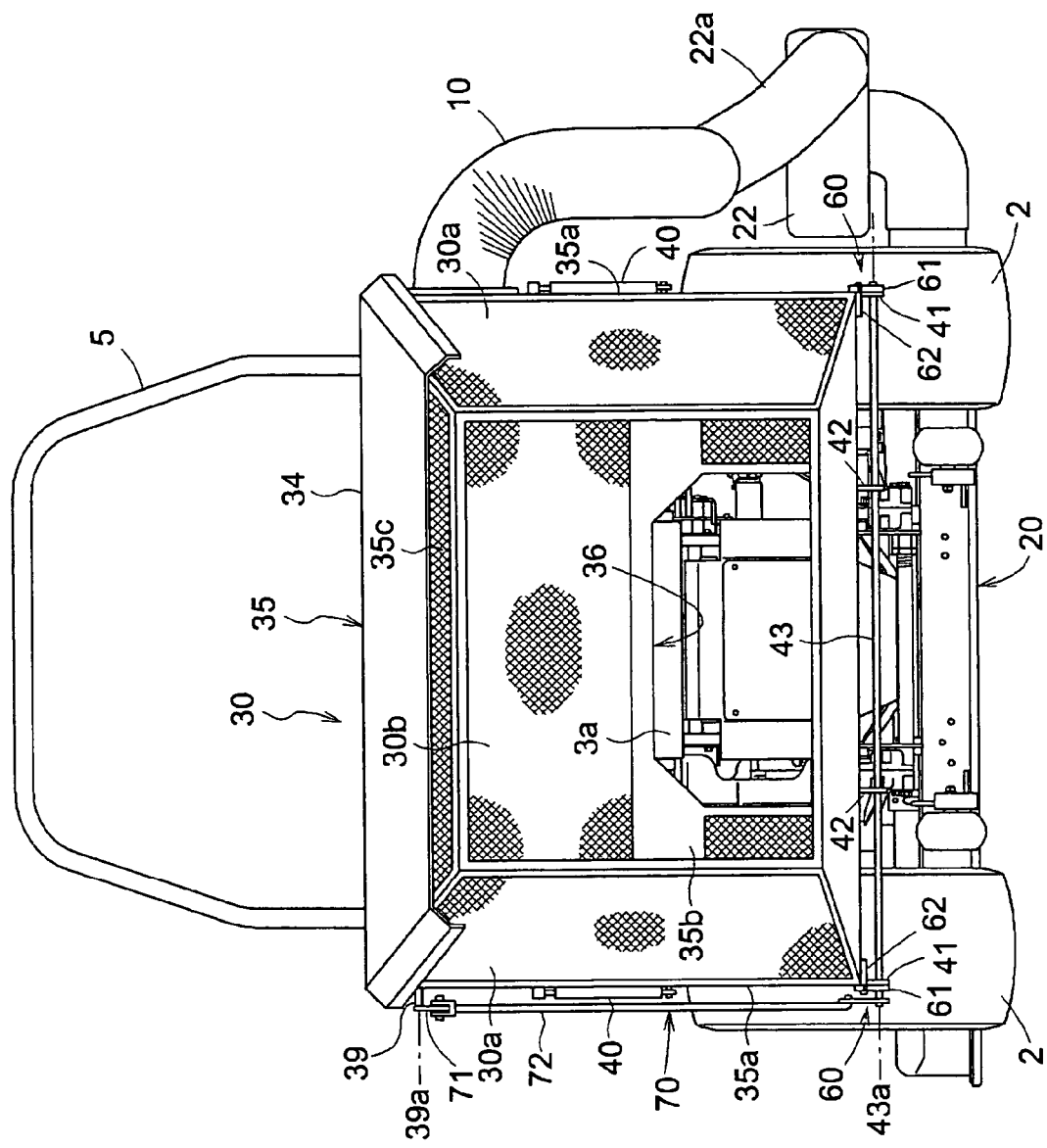
FIG. 4 is a rear view of the riding lawn mower.
Figure 5:
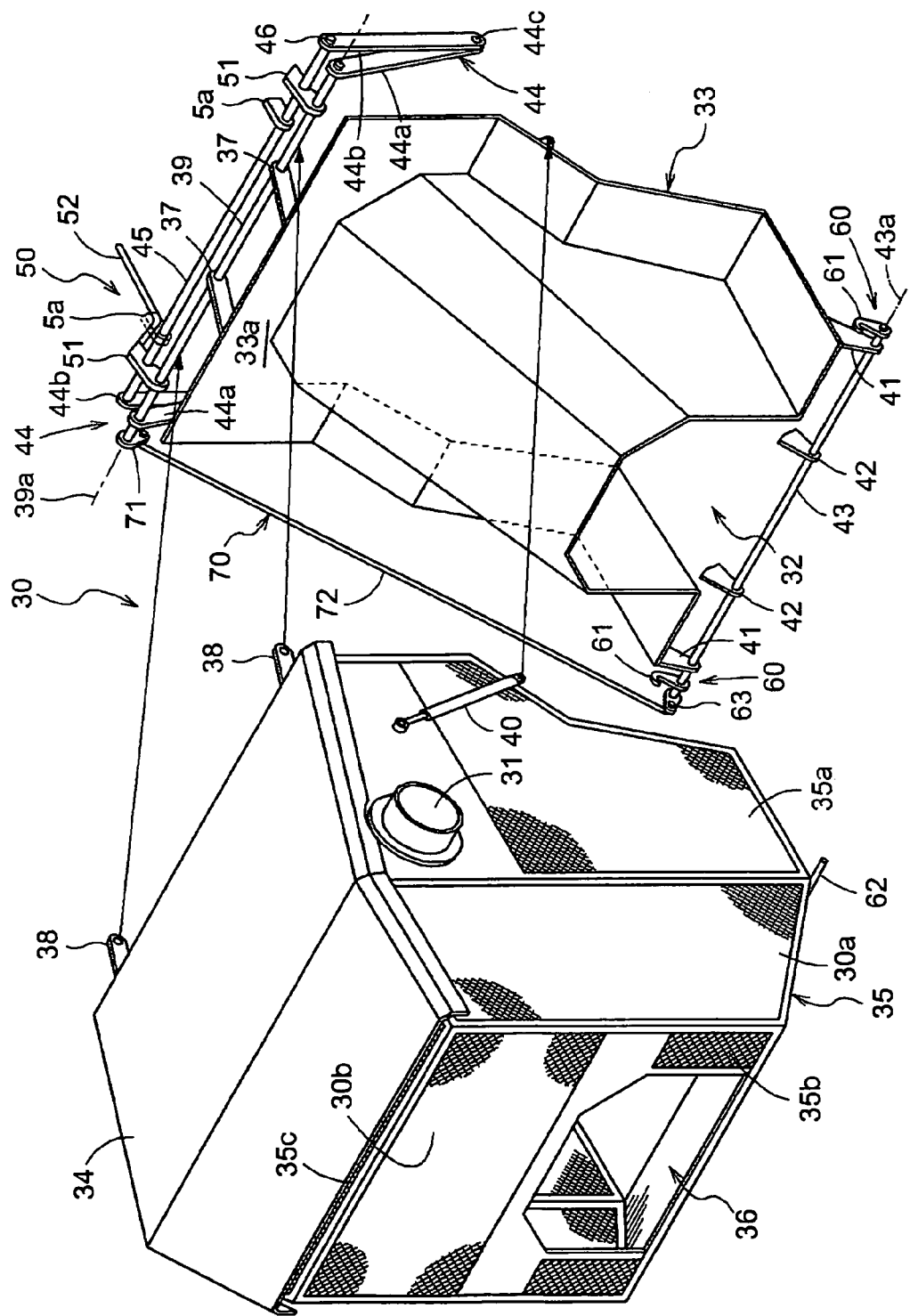
FIG. 5 is an exploded perspective view of a grass catcher.

As shown in FIGS. 4 and 5, the grass catcher 30 has a bottom portion 33 and a lid portion 35. The bottom portion 33 defines a recessed space 32 located in a middle position transversely of the grass catcher 30 and opening rearward and downward, for accommodating the motor section 3. This space 32 is hereinafter called the recess. The bottom portion 33 is made of bent sheet metal. The lid portion 35 is a combination of sheet metal and a metal net material for releasing the carrier airflows entering with grass clippings from the transport duct 10. The bottom portion 33 has a front surface 33a defining front surfaces of a left side container portion 30a, a right side container portion 30a and a center container portion 30b described hereinafter. The lid portion 35 has a top cover plate 34, and the grass inlet 31 formed in a lateral position. The lid portion 35 has a pair of right and left side walls 35a, a rear wall 35b and an upper wall 35c. The rear wall 35b of the lid portion 35 has, disposed in a lower position thereof, an exhaust opening 36 opposed to the recess 32 of the bottom portion 33.

Specifically, a portion to the left of the recess 32 of the bottom portion 33, and a side wall portion and a rear wall portion of the lid portion 35 corresponding to this left side portion, constitute the side container portion 30a on the left side of the grass catcher 30. A portion to the right of the recess 32 of the bottom portion 33, and a side wall portion and a rear wall portion of the lid portion 35 corresponding to this right side portion, constitute the side container portion 30a on the right side of the grass catcher 30. A portion located above the recess 32 of the bottom portion 33, and side wall portions and a rear wall portion of the lid portion 35 corresponding to this upper portion, constitute the center container portion 30b of the grass catcher 30. The center container portion 30b communicates with upper parts of the right and left side container portions 30a. The grass catcher 30 has a recess 32 extending in the fore and aft direction through the grass catcher 30 between lower parts of the right and left side container portions 30a.

Figure 6:
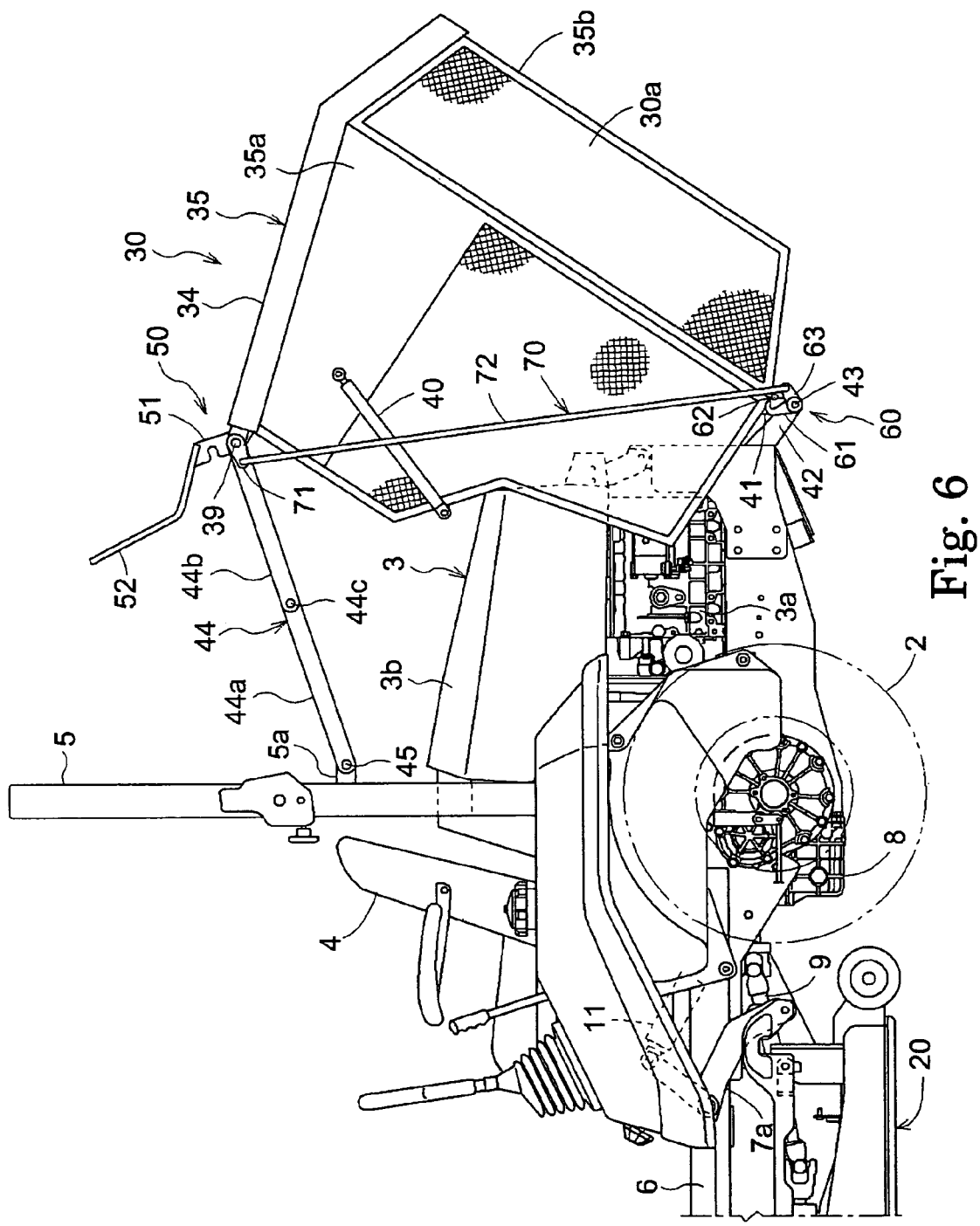
FIG. 6 is a side view of the grass catcher in a state of dumping grass clippings.

As shown in FIGS. 5, 6 and so on, a connecting rod 39 extending transversely of the grass catcher 30 relatively pivotably interconnects a pair of right and left coupling brackets 37 arranged at the upper end of the bottom portion 33, and a pair of right and left coupling brackets 38 arranged at an end of the upper wall 35c of the lid portion 35. Thus, the bottom portion 33 and lid portion 35 are interconnected to be pivotable relative to each other about the axis of the connecting rod 39. The lid portion 35 is vertically pivotable to open and close relative to the bottom portion 33 about the axis 39a of the connecting rod 39 extending transversely of the grass catcher 30 and transversely of the vehicle body. Gas springs 40 are attached to and extend between the side walls 35a of the lid portion 35 and the bottom portion 33, for biasing the lid portion 35 to the open position to lighten its opening operation.

As shown in FIGS. 4, 5, 6 and so on, a connecting rod 43 extending transversely of the vehicle body relatively pivotably interconnects a pair of right and left coupling brackets 41 arranged at the lower end of the bottom portion 33 and a pair of right and left support brackets 42 of the body frame 6. Thus, the bottom portion 33 is pivotably connected at the lower end thereof to the body frame 6. The lower end of the grass catcher 30 is thereby connected to the body frame 6 to be pivotable about the axis 43a of the connecting rod 43 extending transversely of the vehicle body.

As shown in FIGS. 1, 5 and so on, flexion links 44 are arranged in upper positions of the opposite sides of the grass catcher 30, each having a grass catcher side link 44a and a body side link 44b flexibly connected by a connecting pin 44c.

As shown in FIGS. 5 and so on, the body side link 44b of each flexion link 44 is pivotably connected, at the end remote from the grass catcher side link 44a, to a support 46 at an end of a support rod 45 extending transversely of the vehicle body through a pair of right and left brackets 5a fixed to the base of the rollover protection frame 5. The grass catcher side link 44a of each flexion link 44 is pivotably connected, at the end remote from the body side link 44a, to an end of the connecting rod 39 relatively pivotably interconnecting the bottom portion 33 and lid portion 35 of the grass catcher 30.

Thus, each flexion link 44 interconnects the upper end of the grass catcher 30 and the support 46 on the vehicle body. The grass catcher 30 is supported so that the upper end of the grass catcher 30 movable longitudinally of the vehicle body about the connecting rod 43 at the lower end, toward and away from the supports 46.

As shown in FIGS. 1, 5 and so on, the connecting rod 39 has a link lock mechanism 50 including a pair of right and left lock arms 51.

Figure 8A:
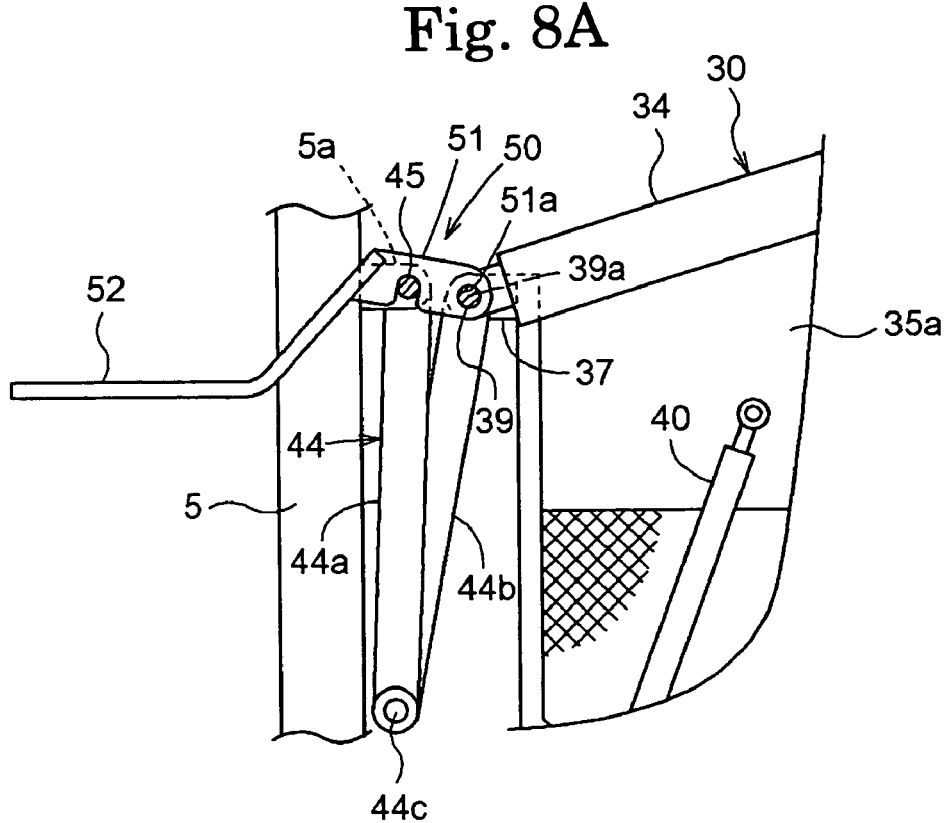
FIG. 8(A) is a side view of a link lock mechanism in a locking state.
Figure 8B:
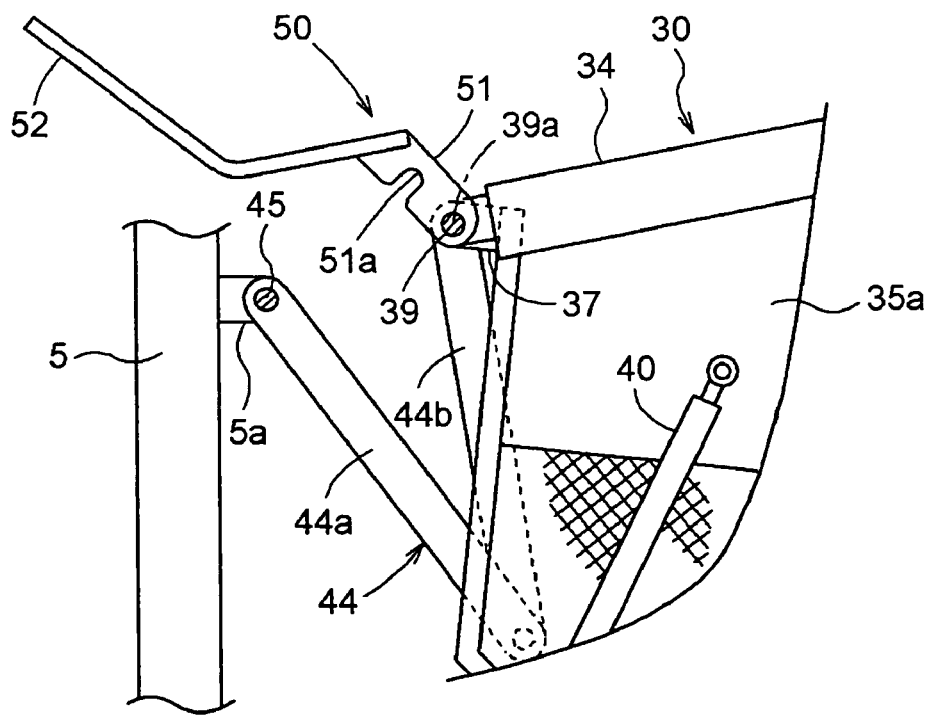
FIG. 8(B) is a side view of the link lock mechanism in an unlocking state.

As shown in FIG. 5 and so on, each lock arm 51 is connected at a proximal end thereof to, to be pivotable with, an end region of the connecting rod 39 relatively pivotably interconnecting the bottom portion 33 and lid portion 35 of the grass catcher 30. A control lever 52 extends from one of the lock arms 51 to be operable for swinging both the lock arms 51 about the axis 39a of the connecting rod 39, whereby, as shown in FIG. 8(A), cutouts 51a formed in distal end regions of both the lock arms 51 are engaged with the support rod 45. In this state, the link lock mechanism 50 assumes a locking state for locking the right and left flexion links 44 to a flexed state with the lock arms 51 pulling the connecting rod 39 toward and holding it in a position close to the support rod 45. When the distal ends of the lock arms 51 are disengaged from the support rod 45, as shown in FIG. 8(B), the link lock mechanism 50 assumes an unlocking state releasing the right and left flexion links 44 from the flexed state with the lock arms 51 ceasing to pull the connecting rod 39.

As shown in FIGS. 1, 5 and so on, a lid lock mechanism 60 is provided on each side at the lower end of the grass catcher 30. The lid lock mechanism 60 includes a hook 61 formed on the bottom portion 33 of the grass catcher 30, and a lock pin 62 formed on the lid portion 35.

As shown in FIG. 5, the hook 61 of each lid lock mechanism 60 is connected at a proximal end thereof to, to be pivotable with, an end of the connecting rod 43 interconnecting the lower end of the bottom portion 33 to the body frame 6. Each lid lock mechanism 60 assumes a locking state with the hook 61 swung about the axis 43a of the connecting rod 43 to be engaged by the lock pin 62, thereby fixedly closing the lid portion 35 to the bottom portion 33. Each lid lock mechanism 60 assumes an unlocking state with the hook 61 disengaged from the lock pin 62, thereby releasing the lid portion 35 from the bottom portion 33.

As shown in FIGS. 1 and 5, an interlocking arm 71 is connected to, to be pivotable with, an end of the connecting rod 39 to which the lock arm 51 of the link lock mechanism 50 is connected. An interlocking rod 72 is connected at an end thereof to the interlocking arm 71. A control arm 63 is connected at a free end thereof to the other end of the interlocking rod 72, and at a proximal end to, to be pivotable with, the connecting rod 43. The interlocking arm 71, interlocking rod 72 and control arm 63 constitute an interlocking mechanism 70 for interlocking the link lock mechanism 50 and the pair of lid lock mechanisms 60.

When the lock arm 51 of the link lock mechanism 50 is swung away from the support rod 45, the connecting rod 39 is swung to swing the interlocking arm 71, pulling the interlocking rod 72, which in turn swings the control arm 63. Then, the connecting rod 43 swings the two hooks 61 out of engagement with the lock pins 62. When the lock arm 51 is swung to engage the support rod 45, the connecting rod 39 is swung to push the interlocking rod 72, which swing the control arm 63. Then, the connecting rod 43 swings the two hooks 61 into engagement with the lock pins 62. Thus, when the link lock mechanism 50 is switched to the locking state, this locking operation switches the pair of lid lock mechanisms 60 to the locking state. When the link lock mechanism 50 is switched to the unlocking state, this unlocking operation switches the pair of lid lock mechanisms 60 to the unlocking state. This is achieved by the interlocking mechanism 70 interlocking the link lock mechanism 50 and the pair of lid lock mechanisms 60.

For performing a grass cutting operation, the control lever 52 is pulled forwardly of the vehicle body to swing the grass catcher 30 forwardly of the vehicle body about the axis 43a of the connecting rod 43, and to switch the pair of flexion links 44 to the flexed state. When the pair of flexion links 44 are switched to the predetermined flexed state, the grass catcher 30 is set to a grass collecting state as shown in FIGS. 1–4, with a rear portion of the engine hood 3b of the motor section 3 lying in the recess 32 of the grass catcher 30. That is, in the grass collecting state, the center container portion 30b of the grass catcher 30 is located above the motor section 3, a lower part of each side container portion 30a is located laterally of the motor section 3, and an upper part of each side container portion 30a is located above the rear wheel 2. When the grass catcher 30 is in the grass collecting state, both the lock arms 51 are engaged with the support rod 45 to place the link lock mechanism 50 in the locking state. Then, the pair of flexion links 44 are locked to the flexed state to fix the grass catcher 30 to the grass collecting state. The pair of lid lock mechanisms 60 can automatically be switched to the locking state by the interlocking action of the interlocking mechanism 70, to close the lid portion 35 fixedly on the bottom portion 33.

Figure 7:
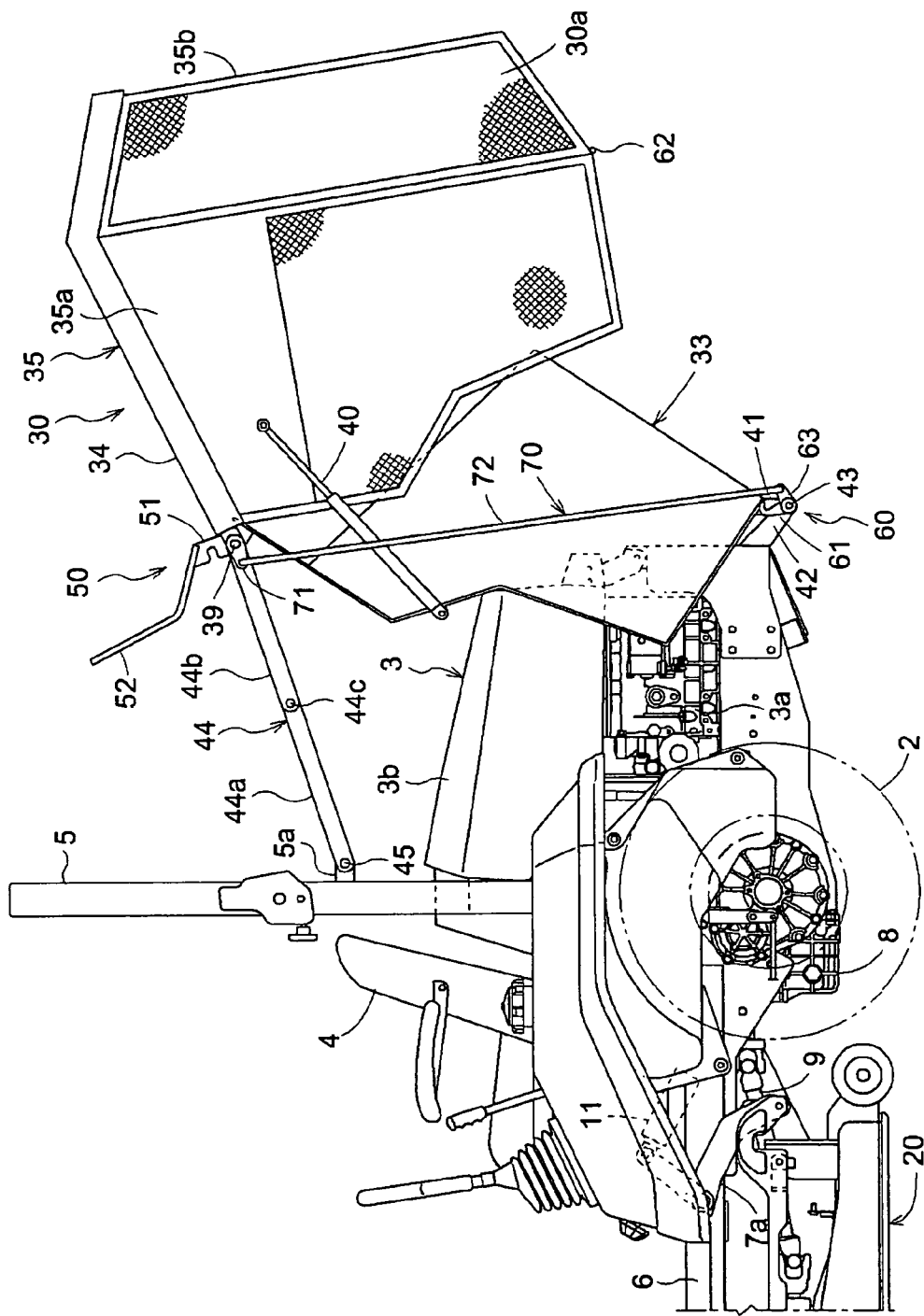
FIG. 7 is a side view of the grass catcher in an open state.

For discharging the grass clippings collected in the grass catcher 30, the control lever 52 is operated to disengage the two lock arms 51 from the support rod 45, thereby switching the link lock mechanism 50 to the unlocking state, and releasing the flexion links 44 from the flexed state. When the control lever 52 is pushed rearwardly of the vehicle body, the grass catcher 30 is swung rearwardly of the vehicle body about the axis 43a of the connecting rod 43, and the pair of flexion links 44 are switched to an extended state. When the pair of flexion links 44 are in the extended state, the grass catcher 30 assumes a grass discharge state turned rearwardly of the vehicle body from the grass collecting state as shown in FIG. 6. At this time, the transport duct 10, which is in the form a bellows tube, can extend without being detached from the grass catcher 30, to allow movement of the grass catcher 30. Further, when the link lock mechanism 50 is switched to the unlocking state, the pair of lid lock mechanisms 60 are automatically be switched, to the unlocking state by the interlocking action of the interlocking mechanism 70. Consequently, as shown in FIG. 7, the weight of the grass clippings acting on the lid portion 35 causes the lid portion 35 to pivot automatically about the axis 39a of the connecting rod 39, to open from the bottom portion 33. Then, the grass clippings collected in the grass catcher 30 fall from between the bottom portion 33 and lid portion 35. Even when collected grass clippings are light and the lid portion 35 must be opened manually, the gas springs 40 exert an opening force to facilitate the opening operation.

What is claimed is:

1. A riding lawn mower comprising:
    a plurality of front wheels and a plurality of rear wheels;
    a vehicle body supported by said front wheels and said rear wheels;
    a hood enclosing an engine disposed in a rear position of said vehicle body;
    a mower unit suspendable from said vehicle body; and
    a grass catcher for collecting grass clippings from said mower unit, said grass catcher including a bottom portion defining a lower portion of the grass catcher, locatable above said hood and having a planar portion, and a lid portion for placement on said bottom portion, said bottom portion being bent downwardly near left and right positions of said hood such that the bottom portion faces lateral surfaces of said hood, and such that said bottom portion defines a recess extending over an entire fore and aft length of said bottom portion for accommodating at least part of said hood.

2. A riding lawn mower as defined in claim 1, wherein
    said grass catcher consists essentially of the bottom portion and the lid portion and wherein
    said lid portion is pivotable relative to said bottom portion about a transverse axis located therebetween.

3. A riding lawn mower as defined in claim 1, wherein said recess space opens through a rear surface of said grass catcher.

4. A riding lawn mower as defined in claim 1, wherein the bottom portion and the lid portion cooperate to form:
    a left side container portion of the grass catcher;
    a right side container portion of the grass catcher; and
    a center container portion communicating with said left and right side container portions in upper positions of said left and right side container portions, and having a bottom surface that forms the planar portion;
    wherein, when said grass catcher is in a collecting position, said bottom surface of said center container portion is located above and along said hood, and at least lower part of each of said left side container portion and said right side container portion is located laterally of said hood, wherein said center container portion, said left side container portion and said right side container portion form the recess that defines a space extending over an entire fore and aft length thereof for accommodating at least part of said hood.

5. A riding lawn mower as defined in claim 4, wherein said grass catcher is pivotable about a transverse axis located at a lower end of said grass catcher, between said collecting position and a grass discharge position pivoted from said collecting position rearwardly of said vehicle body.

6. A riding lawn mower as defined in claim 5, further comprising flexion links interconnecting an upper end of said grass catcher and a support fixed with respect to said vehicle body, said flexion links, when in a flexed state, allowing said grass catcher to move to said collecting position, and when in an extended state, allowing said grass catcher to assume said grass discharge position.

7. A riding lawn mower as defined in claim 6, further comprising a link lock mechanism for locking said flexion links in said flexed state to lock said grass catcher in the said collecting state.

8. A riding lawn mower as defined in claim 7, wherein said grass catcher is switchable between a closed state for holding the grass clippings inside with the bottom portion and the lid portion in contact with each other and an open state for discharging the grass clippings with the lid portion moved away from the bottom portion, and includes a lid lock mechanism for locking said grass catcher in the closed state, said lid lock mechanism being connected to said link lock mechanism for locking said grass catcher in said closed state in response to a locking operation of said link lock mechanism, and releasing said grass catcher in response to an unlocking operation of said link lock mechanism.

9. A riding lawn mower as defined in claim 4, wherein said hood has a rear surface, said left side container portion and said right side container portion having front surfaces located forwardly of said rear surface of said hood.

10. A riding lawn mower as defined in claim 4, further comprising a rollover protection frame, said left side container portion and said right side container portion having front surfaces located closer to a rear edge of said rollover protection frame than to said rear surface of said hood.

11. A riding lawn mower as defined in claim 4, wherein the-bottom portion is a single integral piece; and
said left side container portion, said right side container portion and said center container portion having front surfaces defined by a part of the bottom portion.

12. A riding lawn mower as defined in claim 11, wherein said bottom portion defines bottoms of said left side container portion, said right side container portion and said center container portion.

13. A riding lawn mower as defined in claim 12, wherein said bottom portion further defines a right-hand vertical wall of said left side container portion, and a left- hand vertical wall of said right side container portion.

14. A riding lawn mower as defined in claim 4, wherein said right- hand vertical wall and said left-hand vertical wall of said bottom portion and the bottom surface of said center container portion define said space.

15. A riding lawn mower as defined in claim 4, wherein said left side container portion and said right side container portion have front surfaces located forwardly of rear end edges of said rear wheels.

16. A riding lawn mower as defined in claim 4, wherein said left side container portion and said right side container portion have bottoms located below a bottom of said engine.

17. A riding lawn mower as defined in claim 4, wherein said left side container portion and said right side container portion have bottoms located substantially level with axles of said rear wheels.

18. A riding lawn mower as defined in claim 4, wherein said hood is inclined downward toward a rear direction, and a part of said bottom portion defining the bottom surface of said center container portion is also inclined downward toward the rear direction.

19. A riding lawn mower as defined in claim 4, wherein said space opens through a rear surface of said grass catcher.

* * * * *